July 25, 1933.  G. RAW  1,919,303
APPARATUS FOR SEPARATING DUST FROM AIR AND GASES
Filed Nov. 18. 1932  2 Sheets-Sheet 1
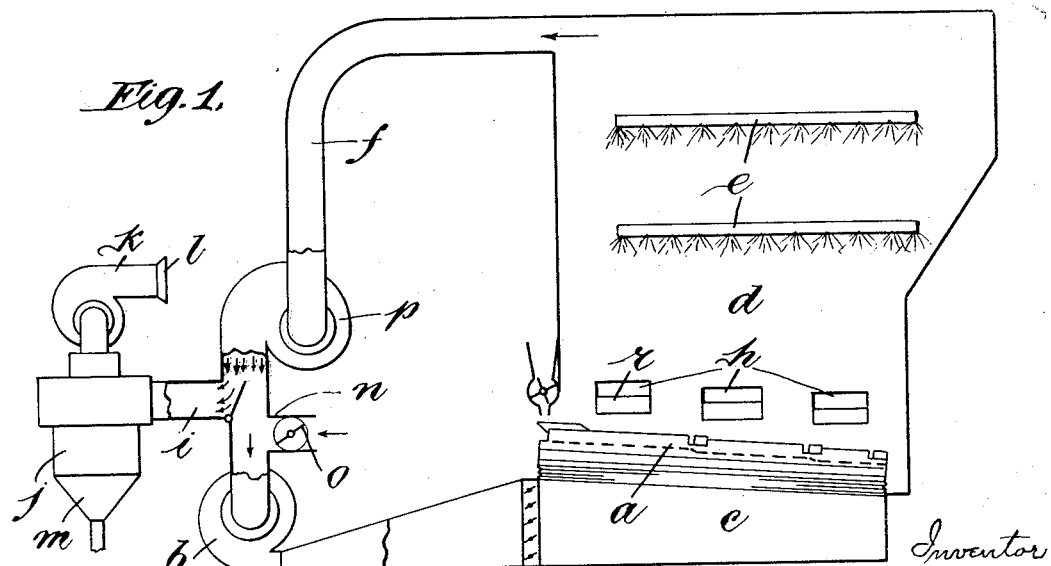

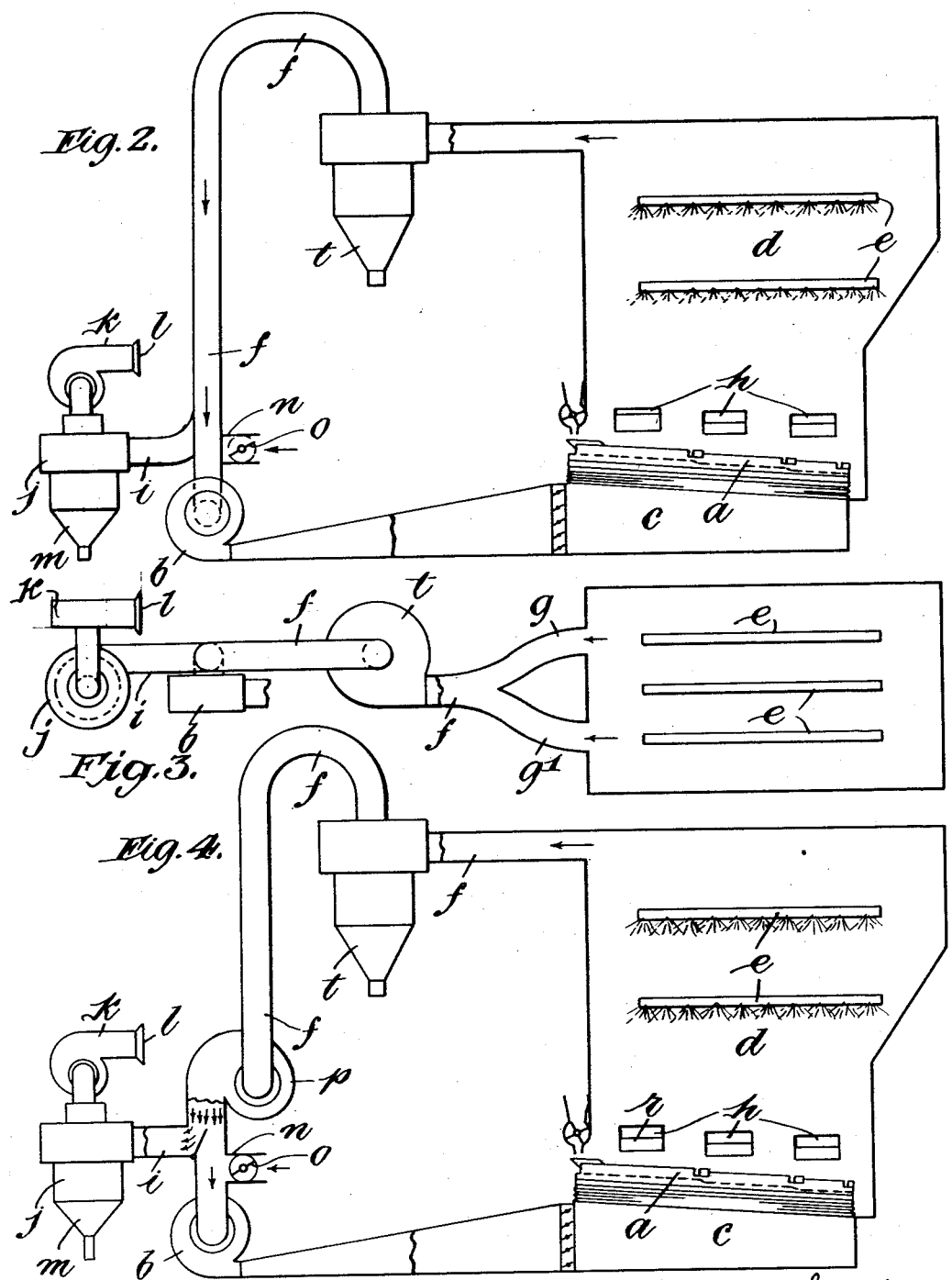

Patented July 25, 1933

1,919,303

UNITED STATES PATENT OFFICE

GEORGE RAW, OF RAVENSWOOD, LOW FELL, ENGLAND

APPARATUS FOR SEPARATING DUST FROM AIR AND GASES

Application filed November 18, 1932, Serial No. 643,257, and in Great Britain November 16, 1931.

This invention comprises improvements in apparatus for separating dust from air and gases and is particularly concerned with an improved method of air cleaning or dust collection in processes for pneumatic separation of dry divided materials.

These processes have various applications in industry and one of these, to which the invention principally appertains, is the dry separation of solid materials of different specific gravities such as the separation of coal from stone and of ores from their gangue.

In such processes the materials are conveniently subjected to the action of air or other gaseous fluid upon so-called separating tables, which may be given a reciprocatory or jigging motion, and in many cases considerable quantities of dust arise from the tables which must be dealt with if the separating plant is to operate under the best conditions and pollution of the surrounding atmosphere by the dust is to be avoided.

The general practice in pneumatic coal cleaning processes has been to deal with the dust separately from and independently of the main air supply for the separating tables by leading it to mechanical or other separators from which the cleaned air was discharged into the atmosphere. Proposals have been made, however, for dealing with dust by using closed circuit separating systems comprising a return circuit leading from the separators to the fan or the like supplying the separators with air and this return has been fitted with a dust collector.

This invention relates to a closed circuit system and has for an object to provide improvements adapted to enhance the efficiency and improve the conditions of operation of the separating plant while avoiding discharge of dust into the atmosphere.

According to this invention the plant for the pneumatic separation of materials of different specific gravities comprises a dust chamber above the separating table or deck, liquid atomizing devices delivering a mist into said chamber for causing coalescence of dust particles and their return to the table or deck or to a delivery chute, a fan supplying the table or deck with gaseous fluid and a closed circuit for returning fluid issuing from the table or deck to the fan, this circuit being provided with centrifugal means for removing part of the air or gas returned to the table. If desired a portion of the air passing from the dust chamber may be shunted or released from the closed circuit, and subjected to a cleaning operation before its discharge to atmosphere. Provision would then be made for the supply of an appropriate amount of fresh fluid to make up for that shunted or released from the circuit. The cleaning operation on the shunted portion of the air may be performed by any suitable apparatus such as a cyclone or centrifugal dust extractor. A second fan may be associated with the cleaning apparatus for the purpose of assisting the suction of air through such apparatus. The centrifugal means in the closed circuit above referred to may comprise a centrifugal blower for drawing air from the dust chamber and the shunted portion of the air led from this blower being advantageously led from the peripheral side, where the air bears the heaviest concentration of residual dust, the remainder of the air passing together with make-up air to the fan supplying the tables.

The coalescence of dust particles combined with the shunting of a part of the air from the system, and the introduction of fresh air in its place, enables the concentration of dust in the air returned to the separating tables to be reduced to a very advantageous working value and as the shunted air is cleaned no discharge of dust into the atmosphere is involved. It should be noted that when dealing with large quantities of air and heavy concentrations of dust it is very costly and almost impracticable with mechanical dust collectors to clean the air completely because they have not a sufficiently high efficiency and therefore in the systems at present in general use where the whole of the separating air is discharged to the atmosphere it is impossible to clean the air to a suitable degree to avoid pollution of the surrounding atmosphere. Cloth filters and electrical precipitation methods are unsuitable and unreliable in operation under such conditions. On the other hand such devices are quite effective and practicable when applied to relatively small volumes of air and relatively low dust concentrations. Thus the minor portion of the air shunted out of the system in accordance with the present invention may be efficiently cleaned so that no pollution of the atmosphere can occur, while at the same time advantages of closed circuit systems are retained and the shunting of part of the air reduces the dust concentration.

Furthermore, a greater efficiency in the centrifugal separators is obtained by reason of the fact that the fine dust has become coalesced as a result of the mist treatment before being subjected to the centrifuging. In other words, the centrifugal separation of larger heavier particles is more readily accomplished than centrifugal separation of finer, dry dust. The mist treatment and centrifugal separation thus closely cooperate to accomplish a thorough cleaning of the air.

The invention is applicable to all pneumatic processes for the separation of solid materials but the provisions outlined are considered to be of particular advantage in connection with the process forming the subject of my prior Patent No. 1,843,405 in which the separation is dependent upon operation of static pressure of the air in the bed of materials. The lower dust concentration obtained brings the air into favourable condition for static pressure operation within the bed and renders it possible to apply the closed circuit system in connection with such process in a reliable and efficient manner, while the very low air velocities associated with the static pressure method make for low dust concentration, thus permitting of the employment of a closed circuit. With higher velocities and higher dust concentrations the closed circuit could not be so effectively operated. Furthermore, with the closely packed bed and large air chamber used in the static method favourable conditions are obtained for the ready settlement of dust, which is essential with closed circuits, as otherwise the dust concentration is liable to get too high for working conditions. The large air chamber, in which static pressure fluctuations occur instead of high air flow, allows of rapid settlement while the very close bed acts as a filter to separate out the bulk of the remaining dust. The combination is thus a very advantageous one.

In order to enable the invention to be readily understood reference will be made to the accompanying drawings which illustrate more or less diagrammatically different examples for carrying the invention into effect in which drawings:—

Fig. 1 is a diagrammatic elevation partly in section of one embodiment of the invention.

Fig. 2 is a diagrammatic elevation partly in section of a modified embodiment.

Fig. 3 is a plan partly in section of Fig. 2, and

Fig. 4 is an elevation partly in section of another modification.

Referring to Fig. 1, one or more separating tables $a$ are arranged in a closed pneumatic circuit including a supply fan $b$ for the table or tables. The latter may be of any convenient construction for example, that described in my patent specification No. 1730947 and are arranged over an air box or chamber $c$ forming part of the circuit. Above the table is a dust settling chamber $d$ into which dust-laden air escapes. Mounted above the table in the chamber $d$ are liquid atomizing devices $e$ for delivering a liquid mist into the chamber as described in the specification of my prior British Patent No. 336221. The mist causes the dust particles to coalesce and to fall on to the table or into a discharge chute. The air escapes from the upper part of the dust chamber into a discharge pipe $f$ through branches $g$ $g'$, similar to those shown in Fig. 3, or other suitable arrangement which is calculated not to produce currents interfering with the static process. The pipe $f$ is connected to the fan $b$ so that the air is maintained in a closed circuit. If desired apertures or inspection openings $h$ may be provided in the walls of the dust chamber above the table so that excess air may be drawn into the return part of the circuit in order to guard against escape of air at the discharge points of the table. Any dust remaining in the circulating air may collect in some part of the system, e. g. the air chamber below the table, from which it may be removed as desired. In addition this dust may be separated or partly separated due to filtration by the bed of materials on the separating table $a$.

In order to remove a part of the dust from the air or gas flowing through the return circuit $f$, a part of it may be shunted and discharged from the system as indicated in Figure 1. Thus a portion of the air is shunted through a pipe $i$ to a dust collector $j$, which as shown is of the cyclone or centrifugal type although it may be any suitable apparatus for cleaning residual dust from the shunted air. If desired the air may be drawn through the dust collector by means of a fan $k$ having a delivery $l$ for the cleaned air to atmosphere. The dust is collected in the lower chute $m$ of the dust collector $j$, and may be taken away as a separate product or be remixed with any of the products of the pneumatic separation. An intake $n$ may be provided adjacent the fan $b$ for admitting fresh air through a valve $o$ to the pipe $f$ to compensate for that released from the circuit at $l$. The supply fan $b$ is thus able to take in a corresponding quantity of fresh air from the atmosphere to make up the total quantity required. Thus the concentration can be reduced to any desired degree. The shunted air is cleaned before passing to the atmosphere and as the quantity is small compared with the total amount of air used for separation purposes, it is possible to clean it by means of one of the more efficient but more costly cleaning devices such as centrifugal separators, cloth filters, electrical precipitators or air washers which will, in the circumstances related, entirely remove dust from the air. If a cloth filter be used, arrangement will be made to discharge the shunted air at a pressure suitable for the operation of the filter, which is usually quite low.

It is preferable that the portion of the air removed from the return circuit shall contain a large proportion of the dust as the returned air will consequently be cleaner and to this end a centrifugal separating device may be inserted in the return circuit, for instance in the embodiments illustrated in Figs. 1 and 4 centrifugal blowers $p$ are in this circuit. The arrangement and disposition of parts is advantageously such that the dust collector $j$ receives the air from the peripheral side of the blower $p$ as the air from this zone bears the heaviest concentration of the residual dust due to the centrifugal action of the blower. The elimination of this particular portion of the air from the circuit would reduce the dust concentration in a greater degree than if the same amount were taken from some other point of the circuit. The relatively cleaner air passes from the inner side of the fan $p$ to the supply fan $b$. The employment of an additional fan $p$ is of advantage when a pulsating pressure is used for the treatment of the materials on the tables $a$, such fan enabling a steady stream of air to be maintained on the return side of the tables. It is not essential however to employ a plurality of fans under pulsating pressure conditions because when a plurality of separators is employed a single fan might be used if the pulsators of the different tables were timed to open in turn and thus maintain a relatively steady air flow. The number of fans used may, of course, be varied according to particular requirements.

Suitable air controlling valves and inlet ports may be provided for adapting the fan or fans to varying requirements of duty and for compensating for leakages of air. Thus apertures $h$ may be provided in the dust-chamber $d$ above the tables as previously described so that a slightly greater quantity of air is present on the return side of the circuit than on the supply side. The excess of air would be drawn into the system over the separating tables where the dust is freed so as to provide a slight inflow of fresh air to the suction hoods over the tables and thus prevent escape of dust into the building in which the plant is housed. The apertures $h$ may serve as inspection openings and may be provided with adjustable hinged or sliding covers or doors $r$.

In the modified arrangements shown in Figures 2, 3 and 4, a cleaning device $t$ such as a centrifugal collector, is inserted in the main return duct $f$ between the dust chamber $d$ and the fan $b$. The whole of the returning air is passed through this cleaning device $t$ before returning direct in closed circuit to the table supply fan $b$.

It is to be understood that the shunt $i$ and associated cleaning mechanism and also intake $n$ may be omitted if desired so that the circuit would then be completely closed.

It is to be noted that particular advantages are obtained in the combinations described when either or all of the cleaning devices $j$ and $t$ which may be included are centrifugal type separators. It is found in practice that this type of dust separator operates with a very much greater efficiency when dealing with dusts which are very slightly moist. The moisture however must not be so great as to make the dust wet. It will be realized from the descriptions and also from my prior British Patent 336,221 that the condition of the dust after it has been treated in the dust chamber by the mist is such that it is ideal for the highly efficient working of the centrifugal collector. The benefit is obtained by either or all of the devices $j$, $p$ and $t$ according to which arrangement or combination is used. The mist treatment thus enhances the value of the centrifugal collector in addition to its usefulness in combination with the closed circuit.

It will be realized that a number of advantageous combinations are available for use according to the particular conditions and by the employment of a suitable one, any condition of dust concentration and volume can be satisfactorily met and very efficient dust collection obtained.

I claim:

1. Apparatus for cleaning dust-laden gaseous fluid in the pneumatic separation of materials of different specific gravities, comprising a separating table, a fan supplying gaseous fluid to said table, a dust settling chamber above said table, liquid atomizing devices delivering a liquid mist into said chamber to cause dust particles uprising from the table to coalesce and the larger coalesced particles to fall, a pipe connected between said dust chamber and fan for returning gaseous fluid from the dust chamber to the fan, and a centrifugal separator mounted in said pipe for separating a substantial portion of the dust from the gaseous fluid returned from the dust chamber.

2. Apparatus for cleaning dust-laden gaseous fluid in the pneumatic separation of materials of different specific gravities, comprising a separating table, a fan for supplying gaseous fluid to said table, a dust settling chamber above said table, liquid atomizing devices delivering a liquid mist into said chamber to cause dust particles uprising from the table to coalesce and the larger coalesced particles to fall, a pipe connected between said dust chamber and supply fan, a centrifugal collector interposed in said pipe for cleaning air returned from the dust chamber, a branch pipe on the return pipe on the return side of said collector, a centrifugal separator for cleaning air shunted through said branch pipe, an exhausting fan for withdrawing air from the return pipe through said branch pipe and discharging it to atmosphere, and controllable means for admitting fresh fluid to said return pipe.

3. Apparatus for cleaning dust-laden gaseous fluid in the pneumatic separation of materials of different specific gravities comprising a separating table, a fan supplying gaseous fluid to said table, a dust settling chamber above said table, liquid atomizing devices delivering a liquid mist into said chamber, a return pipe connected between said dust chamber and said supply fan, a centrifugal blower for exhausting air from the dust chamber, a branch pipe leading from the peripheral side of the centrifugal blower and having an inlet area in the return pipe normal to the direction of flow, a cleaning means for treating air shunted through said branch pipe, and controllable means for admitting fresh fluid to said return pipe.

4. Apparatus for cleaning dust-laden gaseous fluid in the pneumatic separation of materials of different specific gravities comprising a separating table, a fan supplying air to said table, a dust settling chamber above said table, liquid atomizing devices delivering a liquid mist into said chamber, a return pipe connected between said dust chamber and said supply fan, a centrifugal blower for exhausting air from the dust chamber, a branch pipe leading from the peripheral side of the exhausting fan, a skimmer plate extending into the return pipe for directing the heavily dust-laden peripheral portion of the air flow into the branch pipe, a cleaning means for treating air shunted through said branch pipe, a fan for drawing air through said cleaning device and discharging it to atmosphere, and means for admitting fresh air to said return pipe.

5. Apparatus for cleaning dust-laden gaseous fluid in the pneumatic separation of material of different specific gravities comprising a separating table, a dust settling chamber above the table, liquid atomizing means for delivering a liquid mist into said chamber to cause the dust particles to coalesce and the larger coalesced particles to fall, a fan supplying gaseous fluid to said table, a return pipe connected between said dust chamber and said fan, means in said pipe for concentrating the dust content of the return flow toward one portion of the flow, an outlet connection for drawing off the said portion of the flow having an inlet area in the return pipe normal to the direction of flow in said pipe, means for extracting the dust from the gaseous flow drawn off, means for discharging the cleaned fluid from the system, and controllable means for admitting fresh gaseous fluid to the system.

GEORGE RAW.